Jan. 11, 1949.     W. A. MORTON ET AL     2,458,624
METHOD AND APPARATUS FOR ARTIFICIALLY
COMPENSATING FOR THERMAL LOAD CHANGES
IN HEAT TREATMENT FURNACES
Filed April 15, 1942     6 Sheets-Sheet 1

INVENTORS.
William A. Morton
and Edwin C. Smith
BY Edward A. Lawrence
their Attorney.

Jan. 11, 1949.
W. A. MORTON ET AL
2,458,624
METHOD AND APPARATUS FOR ARTIFICIALLY
COMPENSATING FOR THERMAL LOAD CHANGES
IN HEAT TREATMENT FURNACES
Filed April 15, 1942
6 Sheets-Sheet 2
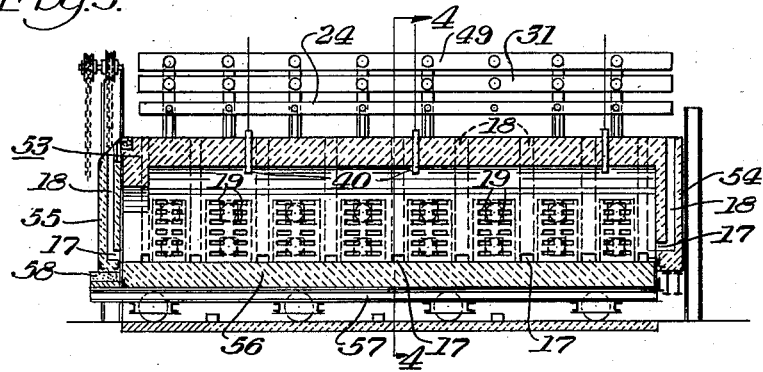
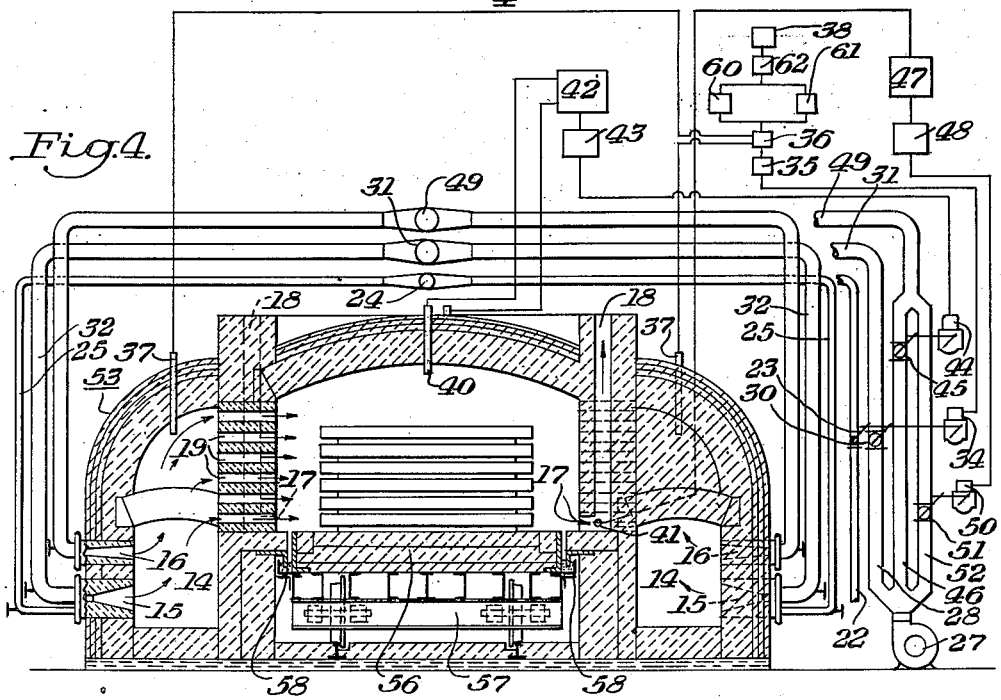
INVENTORS.
William A. Morton
and Edwin G. Smith,
BY Edward A. Lawrence
their attorney.

Jan. 11, 1949.  W. A. MORTON ET AL  2,458,624
METHOD AND APPARATUS FOR ARTIFICIALLY
COMPENSATING FOR THERMAL LOAD CHANGES
IN HEAT TREATMENT FURNACES
Filed April 15, 1942  6 Sheets-Sheet 3
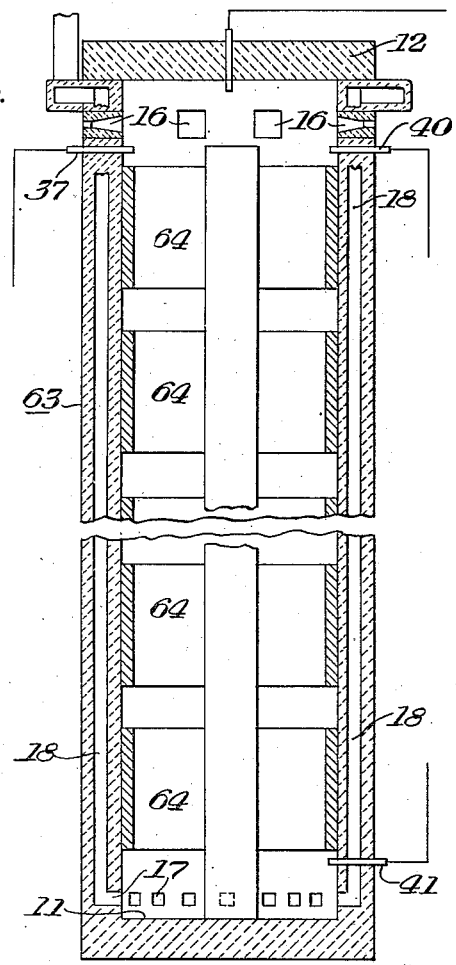
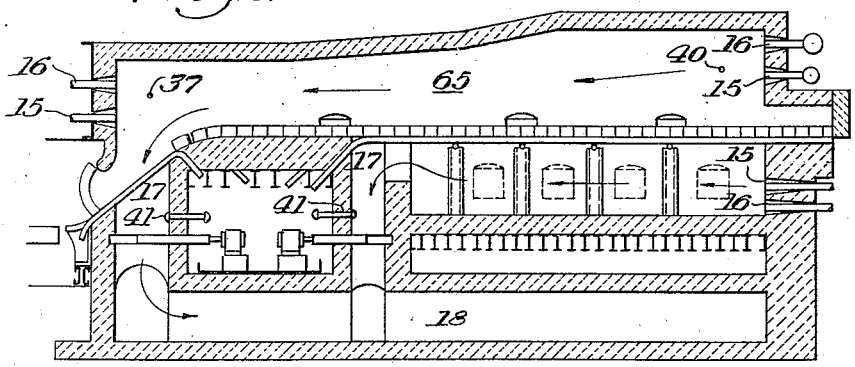
INVENTORS.
William A. Morton
and Edwin C. Smith,
BY Edward A. Laurine.

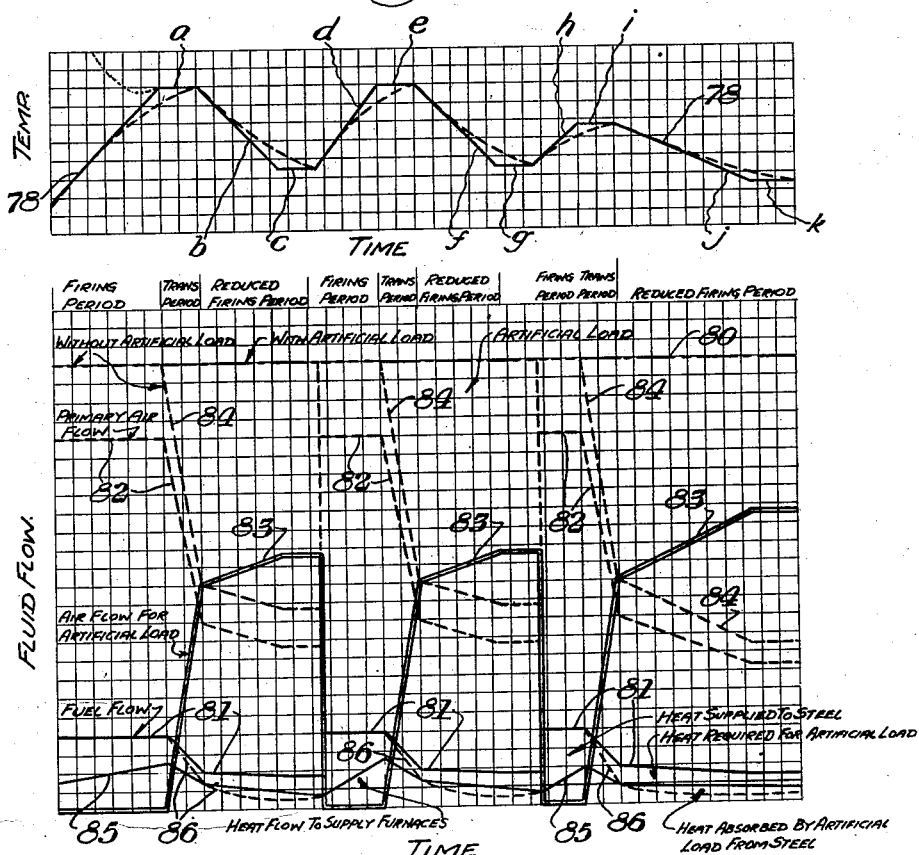

Patented Jan. 11, 1949

2,458,624

UNITED STATES PATENT OFFICE 2,458,624

METHOD AND APPARATUS FOR ARTIFICIALLY COMPENSATING FOR THERMAL LOAD CHANGES IN HEAT-TREATMENT FURNACES

William A. Morton and Edwin G. Smith, Mount Lebanon Township, Allegheny County, Pa., assignors, by mesne assignments, to Amsler Morton Corporation, Pittsburgh, Pa., a corporation of Delaware Application April 15, 1942, Serial No. 438,986

19 Claims. (Cl. 263—40)

This invention relates generally to the heating of materials, and more specifically to a method and apparatus for the positive control of the thermal cycle in heating, reheating, or heat treatment of materials in various types of commercial furnaces by means of artificial loading. This invention is especially adaptable to batch type furnaces but may also be employed on continuous type furnaces which are subect to periodic interruption and require flow compensation to move heat from one zone to another zone without increasing the potential at the source.

Artificial loading of a furnace may be defined as the admission of a non-combustible fluid to the furnace chamber through the burner openings when the maximum percentage of loading fluid is small as compared to the normal flow of combustibles, or the admission of a non-combustible fluid through independent ports where the loading fluid requirements are large, to insure a constant flow of gases through the furnace irrespective of the variations in temperature of the furnace or the degree of thermal saturation of the materials therein. The total quantity of air or waste gas admitted to the furnace is controlled by means of a furnace pressure controller which regulates the quantity of loading fluid to maintain a constant pressure in the furnace and by a temperature differential controller which admits loading fluid to the furnace when the temperature difference between a point near the source of the combustible mixture and a point within the furnace in the stream of exit gases exceeds a predetermined minimum.

The positive control of the thermal cycle is obtained by artificial or fluid loading of the furnace to compensate for a normal tendency to decrease the flow of the fluid or carrier of heat as the saturation of the material progresses whereby the transfer of heat to all parts of the furnace proceeds at a uniform rate, even though the demand of the product for heat has been satisfied.

This is particularly desirable in furnaces in which the product must be held for treatment for many hours after reaching a predetermined elevated temperature, and permits accurate control of the temperature of the material through a prescribed thermal cycle in the heating program. Different mediums, such as solids, liquids and gases, may be employed for artificially loading the furnace but the most practical of these are the gases, as they are easily supplied, quickly regulatable, and readily responsive. With gases as the artificial loading medium the next consideration is the character of the atmosphere to be employed in the heating process. In annealing and normalizing, a reducing or inert medium is frequently desirable, and for heating, generally air is the medium used in artificial loading. However any of the various gases may be employed to carry out the principle of artificial loading.

By the use of artificial loading with a thermal program timer, the heat input may be regulated to follow precisely a predetermined thermal cycle. Thus the material being heated, cooled, or both in sequential intervals, may be accurately controlled to produce the desired characteristics in the materials, whether they may be degrees of hardness, softness, removal of strains, size of grain structure, control of grain growth, and the production of grain uniformity. In reducing and fusing materials other types of thermal programs are followed to produce the desirable characteristics of the materials worked with.

The process comprising this invention is therefore advantageously applicable to all types of furnaces for the heating of various kinds of materials. The furnaces may be heated electrically or by solid, liquid or gaseous fuel. Again the furnaces may be of the batch type, such as a soaking pit furnace, a horizontal car type furnace, or a continuous furnace such as a heating, reheating or annealing furnace, or a fusion or melting furnace. The use of regenerators or recuperators with these furnaces does not interfere with the practice of this invention.

By accurately controlling the thermal cycle in furnaces of this character, losses due to changes in metallurgical characteristics are reduced to a minimum and losses due to strains are avoided.

The principal object of this invention is the provision of a method and apparatus for artificially loading a furnace to produce a sustained fluid flow of a thermal carrier medium, at a predetermined temperature independent of the thermal demand or state of thermal saturation of the material being heated to insure a uniform thermal environment for the material.

Another object is the provision of a method and apparatus for producing a uniform atmosphere throughout a long or deep furnace, by constant flow.

Another object is the provision of a method and apparatus to positively control a heating and subsequent cooling phase of a thermal cycle while maintaining a positive atmospheric pressure within the furnace.

Another object is to maintain a constant fluid flow independent of the temperature of the materials being heated.

Another object is to supply excess fluid to the burned gases contained in a furnace or combustion chamber as a diluent independent of the fluid entering through a burner to regulate the temperature of the burned gases without altering or influencing the character of the flame during the burning of the gases.

Other objects and advantages appear in the following description and claims.

In the accompanying drawings selected practical embodiments illustrating the principles of this invention are shown wherein:

Fig. 3 is a vertical sectional view taken longitudinally of a car type batch annealing furnace.

Fig. 4 is a transverse sectional view, on enlarged scale, taken on the line 4—4 of Fig. 3.

Fig. 5 is a vertical sectional view of a deep, electrically heated annealing furnace.

Fig. 6 is a vertical sectional view taken longitudinally of a continuous heating furnace.

Fig. 9 is a typical graph of the thermal cycle in normalizing long ingots obtained through the control of artificial loading.

Fig. 10 is a graph illustrating the fuel and resulting temperature characteristics with a constant artificial load.

The present invention being applicable to most types of commercial heating furnaces, it naturally follows that it is practical to illustrate and describe only a selected and limited number of these furnaces for the purpose of disclosing this invention, and it should be understood that the underlying principles are equally applicable to other styles and to other types of furnaces.

Figure 1:
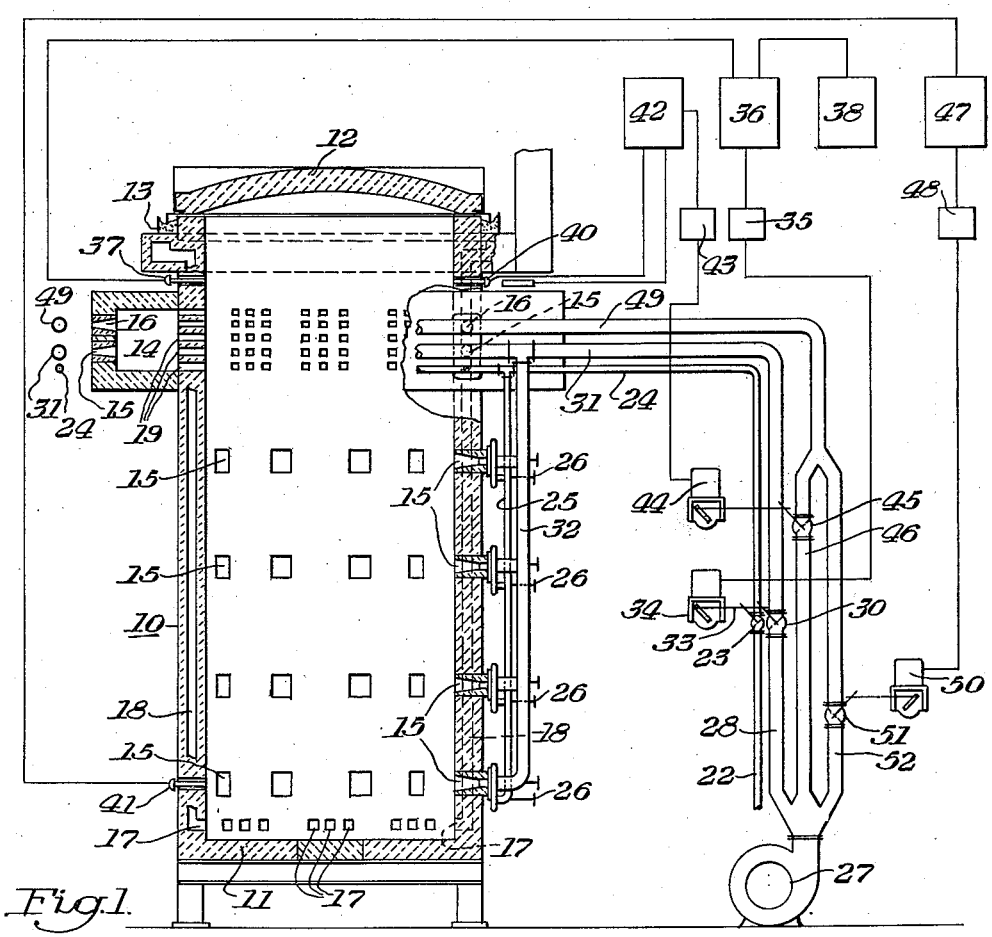
Fig. 1 is a vertical sectional view of a batch type deep pit furnace showing the burners and artificial loading ports, together with piping and controls for the same.
Figure 2:
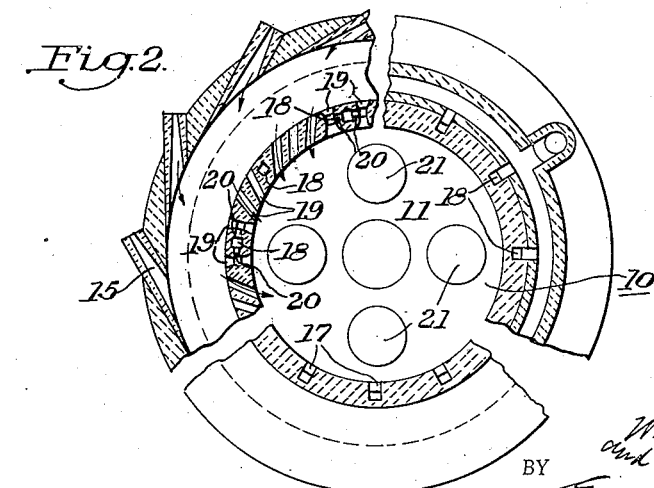
Fig. 2 is an irregular horizontal sectional view, taken at different elevations, of the furnace illustrated in Fig. 1 showing the burner and artificial loading ports, parts being broken away.

Referring principally to Figs. 1 and 2 of the drawings, a batch type soaking pit heat treating furnace 10 is shown. This particular pit furnace is considerably deeper than the ordinary soaking pit furnace as it is being operated at the present time for the purpose of heat treating ingots for ordnance which are approximately seventy-seven inches in diameter and two hundred and twenty inches long. The heat treatment of an ingot of this size has always been a problem, and the present practice is to strip the ingot when solidified and bury it under slag for two weeks, during which time it is permitted to cool. Obviously many uncontrollable factors are present in such a process and they frequently prove detrimental to the ingot, resulting in considerable loss.

Heretofore it has been impractical to produce and maintain a uniform temperature in a pit furnace of this depth, and there are no known methods of controlling the cooling of the ingots of this magnitude to complete the heat treating thermal cycle. The method and apparatus which accomplishes these features therefore form an important part of the subject matter of this disclosure.

The pit 10 is provided with the usual hearth 11 covered with coke breeze or other suitable granular material, and is closed at the top by the removable cover 12 which may be provided with a suitable annular seal as indicated at 13.

The outer perimetral wall of the annular mixing and precombustion chamber 14 surrounding the upper end of the furnace pit is provided with upper and lower rows of spaced ports. The ports in the lower row are the burner ports 15 while the ports 16 in the upper row are for the purpose of admitting the artificial loading medium, which in this instance is air, to the furnace. These ports are preferably disposed tangentially to the furnace wall to thoroughly mix the gases in this chamber. That portion of the pit furnace forming the inner wall of the chamber 14 is provided with spaced groups of angularly disposed ports 19 which conduct the burning gases and the artificial loading from the chamber 14 into the furnace pit.

If it is necessary to supply additional heat to the furnace a plurality of angularly disposed burner ports 15 may be positioned in annular spaced relation at different elevations in the pit as illustrated in Figs. 1 and 2.

It is preferable to employ the precombustion chamber 14 in order to thoroughly mix the artificial loading medium with the fuel before its introduction into the pit. If the construction of the furnace does not permit the use of this chamber, an annular series of artificial loading ports 16 may be placed in the furnace wall above the row of burner ports 15 near the top of the pit.

The outlets 17 of this pit furnace are spaced around the furnace wall above the hearth 11 and connected to the vertical flues 18 which rise within the furnace wall to the top of the furnace where the products of combustion are collected by a suitable header and exhausted through a stack as shown. It will be noted from Fig. 2 that the flues 18 are arranged in spaced relation between the groups of ports 19. These flues may be connected to the adjacent ports 19 which have a Venturi shape, as illustrated at 20 in Fig. 2 to produce a suction and thereby create a recirculation of a portion of the products of combustion. This recirculation of the gases aids in maintaining a uniform pressure and temperature throughout the furnace chamber but it is not essential to the practice of artificial loading.

Owing to the size of the ingots 21 only four are placed on the hearth and the burners 15 and artificial loading ports 16 are angularly disposed as illustrated in Fig. 2 to produce a general swirling of the gases in a counterclockwise direction around the ingots.

The fuel in this instance is gas and is supplied by the line 22, through the control valve 23 to the horizontal circular header 24 and the vertical branch headers 25, through the individual valves 26 to the burners 15.

The air is supplied by the fan 27. As illustrated this air may be used for both the primary air and for artificial loading. Thus branch air line 28, having the air control valve 30, leads to the circular header 31, while the primary air is fed through the vertical branch headers 32 to the burners 15.

The valves 23 and 30 which control the gas and primary air respectively are connected to the common operating arm 33 of the fuel valve drive unit or servo motor 34 which in turn is energized by the fuel relay 35. The relay 35 in turn is energized by the temperature recording controller 36 which is regulated by the thermocouple 37 in the furnace and the program timer 38 that is provided with suitable means for exacting a predetermined thermal cycle which may include both a heating and a cooling phase.

The artificial loading ports 16 are supplied with air controlled from two independent furnace pressure regulating sources, the top furnace pressure tube 40 and the bottom furnace pressure tube 41. The top pressure tube 40 initiates pressure regulation through the pressure controller 42 which energizes the artificial loading valve relay 43 which in turn energizes the artificial loading valve drive unit or servomotor 44. The servomotor 44 in turn actuates the air valve 45 in the branch air line 46.

The bottom pressure tube 41 initiates the pressure regulation in the same manner through the pressure controller 47, the valve relay 48, and the servomotor 50, to actuate the air valve 51 in the branch line 52. Both of the branch air lines 46 and 52 feed the artificial loading header 49.

By the use of one or more furnace pressure regulating devices for controlling the introduction of artificial loading into the furnace, accurate and positive control of the thermal cycle of the materials may be obtained. The use of a plurality of pressure regulating devices in a long or deep furnace insures uniform pressure conditions within the furnace chamber, and they may be adjusted to provide a constant pressure through the thermal heating cycle, thereby resulting in a constant fluid flow through the furnace chamber.

With constant pressure conditions in the furnace chamber, the program timer functions to supply a sufficient amount of fuel to raise the furnace to a predetermined temperature. Since this fuel must heat the furnace, supply the losses, heat the material, and heat the artificial load, the demand may be high until the temperature of the material approaches the desired ultimate temperature, at which time all four are in phase.

When the program timer requires an increase in temperature additional heat is supplied and the rate of consumption of heat for the furnace and its losses is less than the rate of heat consumption required by the material. However, the rate of heat consumption required by the artificial load is in proportion to the variations of furnace pressure which may be kept constant throughout the heating cycle or may also be varied to follow a predetermined pressure cycle. However the volume of the artificial load must always require more heat consumption than that of the furnace losses, or control would be impaired.

The artificial loading would have the immediate tendency to cool the furnace and the material, and to prevent this occurrence additional heat is demanded by the thermocouple 37, and supplied, by compensating for the lack of heat prescribed, by the program timer 38 through the controller 36. On the other hand the material, which is absorbing heat at a predetermined rate, actually requires less heat as the operation proceeds, and consequently the fuel supply diminishes as the temperature of the material approaches the ultimate desired temperature. In this manner the resultant temperature of the material is made to accurately follow the predetermined thermal cycle that is set up by the program timer.

When heat saturation of the material is reached a sufficient amount of fuel is supplied to maintain this temperature. During this phase of the thermal cycle, and under favorable operating conditions, the supply of fuel, primary air, and artificial loading is substantially constant and the amount of fuel supplied is substantially greater than that required for the furnace losses, since the artificial load is somewhat greater than the heat loss when the fluid flow is constant. The total fluid flow may be doubled or trebled without changing the furnace temperature. This may be accomplished by opening the waste gas dampers, so that the flow required to hold the furnace pressure constant is increased, or the furnace pressure may be increased without changing the dampers, to increase the fluid flow.

When the program timer requires a reduction of temperature of the material at a predetermined rate, the fuel supply is reduced, which in turn lowers the furnace pressure, causing the pressure tubes 40 and 41 to respond instantly and increase the flow of artificial loading. The reduction in fuel and the thermal drop in the furnace lowers the volume input of gas and primary air, thereby causing a reduction of the furnace pressure, which is immediately compensated by the increased flow of artificial loading. The increased volume of artificial loading further cools the furnace and the material, but the thermocouple quickly responds to maintain the rate of temperature reduction within the differential limits set by the temperature controller.

With this cross check, created by the reduction of the supply of fuel and the increased supply of artificial loading to compensate for the same, the resultant temperature of the material may be accurately lowered at a predetermined rate.

When the material reaches the proper lower temperature, the program timer may be set to reheat it to the critical temperature, hold it for a period of time, then again reduce the temperature. Repeated thermal cycles of this character such as disclosed in Fig. 9 may be employed to properly normalize the material and heat treat it to produce definite and uniform physical characteristics, thereby avoiding losses.

This same process is obvious applicable to a car type batch annealing furnace 53, such as illustrated in Figs. 3 and 4, which is used for annealing armor plate, long anti-aircraft gun barrel blanks and other similar material. This furnace is closed at one end by the permanent wall 54 and provided with a door 55 at the other end. The hearth 56 is supported on the car chassis 57. A seal 58 carried by the car is arranged to cooperate with the bottom of the door and the sides and end of the car to completely enclose the combustion chamber.

In the car type batch annealing furnace of Figs. 3 and 4 the precombustion chambers 14 are disposed longitudinally at the sides of the furnace chamber. The burner ports 15 are located in the outer wall of the precombustion chamber 14 with the artificial loading ports 16 positioned thereabove. The gases rise from the precombustion chamber 14 and flow through the ports 19 into the furnace chamber.

Figure 11:
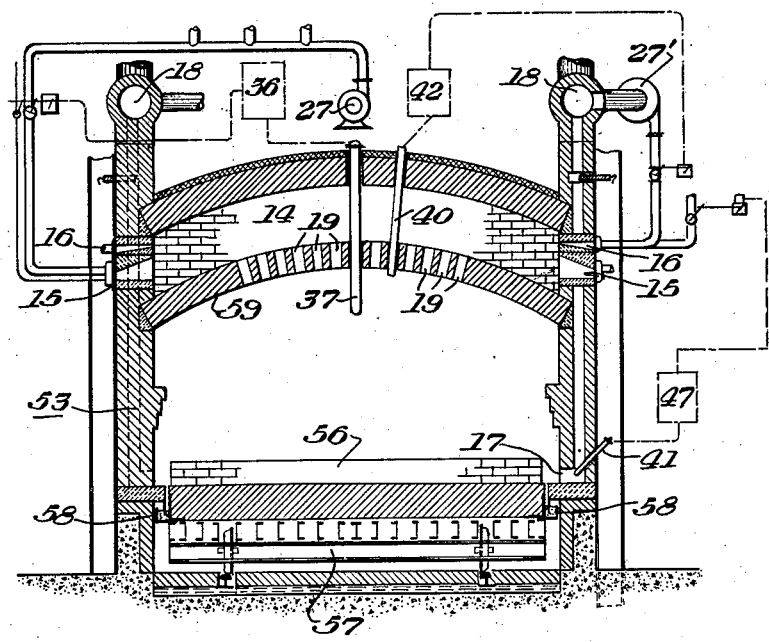
Fig. 11 is a vertical sectional view taken transversely of a car type batch annealing furnace.
Figure 12:
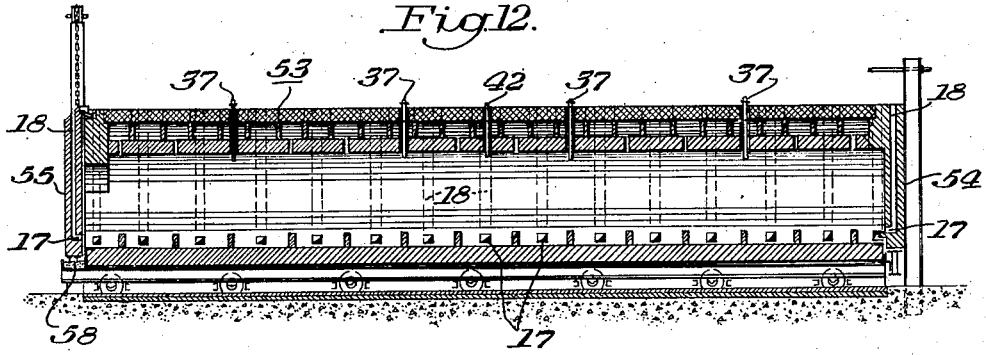
Fig. 12 is a longitudinal vertical sectional view of the furnace illustrated in Fig. 11.

The furnace disclosed in Figs. 11 and 12 is also a car type batch annealing furnace, and is similar to the furnace shown in Figs. 3 and 4. In Figs. 11 and 12 the precombustion chamber 14 is formed in the top of the furnace by means of an arch 59 spaced from the roof and provided with the ports 19 for directing the flow of gases from the precombustion chamber downwardly into the furnace chamber. The burner ports 15 and the artificial loading ports 16 are located in the furnace side walls between the roof and the arch 59. This furnace arrangement conserves space compared to that required by the furnace illustrated in Figs. 3 and 4. Since the ports 19 cannot be connected with the flues 18, as illustrated at 20 in Fig. 1, a fan 27' is arranged to draw a portion of the products of combustion from the flues 18 and recirculate them through the precombustion and furnace chambers.

The outlets 17 in both of these car type furnaces are located at the bottom of the furnace chamber and connect with the vertical flues 18 in the walls and in the door of the furnace.

The gas and air is supplied in the same manner and the controls function to produce the same results as that described with reference to Fig. 1 with the exception that a heat increase interrupter 60, a heat decrease interrupter 61 and a transfer relay 62, shown in Fig. 4, are interposed between the program or cycle timer 38 and the temperature controller 36 for the purpose of following a specific thermal cycle wherein the material is heated to a high temperature during the first period, held at this temperature for the second period, withdrawn from the furnace to cool during the third period, reheated to a lower temperature in the fourth period, held at this temperature in the fifth period, and in the sixth period the material is cooled at a predetermined rate within the furnace. A thermal program of this character may be easily set up by the use of the on and off interrupters 60 and 61 operating in conjunction with the transfer relay 62. Previously it was impossible to accurately control the rate of heating and the rate of cooling the material while it is within the furnace. However the artificial loading enables this to be accurately carried out, while insuring positive distribution of the heat.

In Fig. 5 an electrical heat treating furnace 63 is illustrated. This type of furnace is used for heat treating large gun or cannon barrels. The heat is supplied by means of a series of electrical heating elements 64, each of which is provided with an independent control for regulating the temperature of the particular zone that it occupies, and all of these independent temperature regulators are in turn actuated by a master controller which sets the thermal program and determines the ultimate temperature of the furnace together with the rate at which the material is to be heated or cooled.

This master control naturally functions in response to the artificial loading which is directly effective upon the independent and master temperature controls. A group of artificial loading ports 16 are positioned adjacent the top of the furnace 63 and a group of outlet ports 17 are located adjacent the hearth. The outlet ports are connected with the flues 18 in the wall of the furnace and the flow of the artificial load medium is controlled in the same manner by means of the pressure tubes 40 and 41 located adjacent the top and bottom of the furnace respectively. It is not deemed necessary to repeat the showing of the artificial loading controls in view of Figs. 1 and 4.

Fig. 6 illustrates a continuous furnace 65 provided with skids and a solid soaking hearth in the same plane and over which the billets are shoved in passing through the furnace. The billets on the skids form a division wall, producing an upper and lower heating chamber which are independently fired by the burners 15. The upper chamber is provided with burners at the discharge end for supplying heat for the soaking hearth or for maintaining the billets at the proper temperature during mill delays. A set of artificial loading ports 16 are provided with each set of burners and the furnace pressure control tubes 40 and 41 are located adjacent the inlet and outlet of each heating chamber to regulate the flow of the artificial loading medium and thereby provide a constant furnace pressure so that the temperature of the material may be accurately controlled. There may be the further need of increasing the volume of gases in motion in the furnace to insure the proper rate of heat transfer remote from the burners. Artificial loading satisfies this need.

Figure 7:
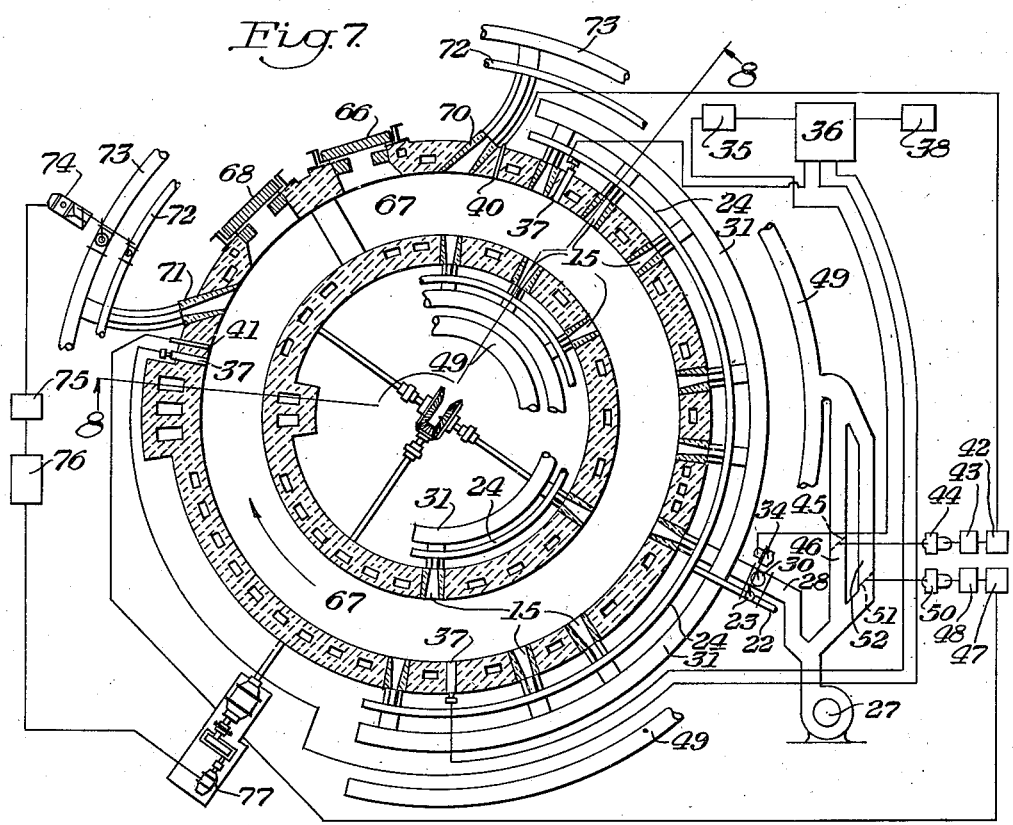
Fig. 7 is a horizontal sectional view of a billet heating furnace having a continuous annular rotary hearth.
Figure 8:
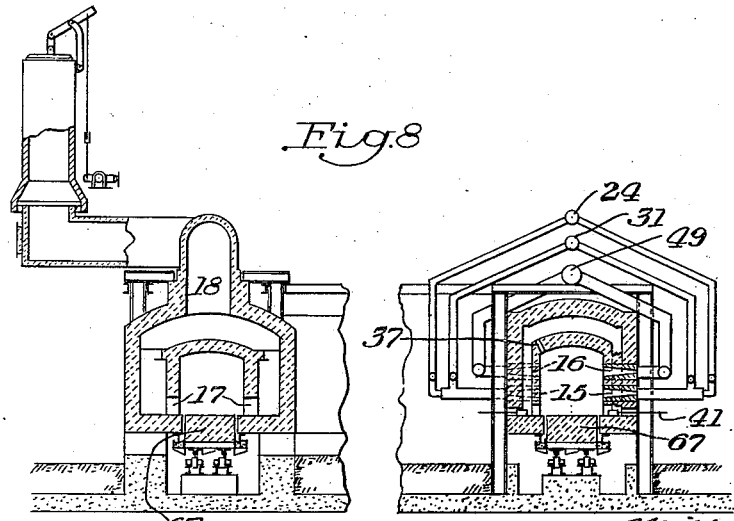
Fig. 8 is a broken transverse sectional view taken along the line 8—8 of Fig. 7.

In Figs. 7 and 8 a continuous rotary hearth furnace is shown wherein the billets are loaded through the door 66 onto the continuous rotary hearth 67 and carried around the furnace and discharged through the door 68. Aside from the charging and discharging zone burners 70 and 71 this circular furnace is heated by the burners 15 which occupy substantially the first half of the furnace chamber. The burners 15 are supplied with gas by the circular headers 24 and with primary air from the circular headers 31. The charging and discharging zone burners 70 and 71 are fed independently through the gas and air lines 72 and 73 controlled by the servo motor 74, which in turn is energized by the relay 75. The relay 75 is in turn energized by the hearth drive starter 76 which controls the motor 77 that operates the hearth driving mechanism. This type of furnace operates in the same manner as that described with reference to Fig. 1 and the controls function to maintain a constant flow of fluid through the furnace chamber and to provide a constant and uniform furnace pressure throughout the long furnace chamber.

The graph shown in Fig. 9 is a typical thermal cycle curve 78 illustrating the procedure for normalizing the large ingot of the character treated in the pit furnace of Figs. 1 and 2. The solid line represents the furnace temperature and the broken line the temperature of the material. If the ingots are cold the initial part of the curve follows the solid line. If the ingots are hot the initial part of the curve follows the dotted line. The ingot having been formed and solidified is still hot and is placed in the pit. The program timer stabilizes the temperature at approximately 1500° F. for twenty-four hours as indicated at $a$. The temperature of the furnace is then lowered at a predetermined rate represented by $b$ to approximately 650° F. in the next twenty-four hours and is held there for approximately twelve hours, as illustrated by the section $c$ of the graph. Obviously any change in the temperature of the material will lag that of the furnace. Thus the period $c$ of constant furnace temperature is made sufficiently long to equalize the temperature of the material with that of the furnace. The temperature of the furnace is then raised at a predetermined rate represented by $d$ to approximately 1500° F. in less than twenty-four hours and held there for twelve hours as shown at $e$, the temperature of the material following the dotted line until it reaches the temperature of the furnace as shown. This temperature is just above the critical range of the steel where the structure of the grains undergoes a change.

At the end of this four day period the temperature of the furnace is lowered at a predetermined rate indicated by the line $f$ to 650° F. where it is held for approximately twelve hours represented by the curve section $g$. The rate of cooling the steel in this phase determines the character and size of the grain structure. The short rise $h$ to 1150° F. and the stabilization period $i$ together with the slow rate of decreasing the temperature of the furnace as illustrated by $j$ insures a uniform grain structure throughout the steel, eliminating any strains or internal forces such as those occur in the present method of normalizing these big ingots by burying them in slag pits. After the temperature of the ingots has been stabilized at about 500° F. for approximately twelve hours, as illustrated at $k$, they may be drawn and started through the work program. If the ingots are to be hot-worked they are again heated to the proper temperature and withdrawn as needed.

The whole of this thermal heat-treating cycle represented by the curve 78 has taken approximately nine days, which is four days shorter than the present normalizing cycle accomplished by burying the ingots in slag pits. In the present day practice there is danger of producing an ingot that has internal strains which may not show up until after a considerable amount of work and expense has been applied to the ingot. The elimination of this hazard is a material improvement in this art.

By manipulating the controls of this apparatus and the program timer, the rate of heating and cooling the material may be accurately controlled. A faster cooling rate may be produced in the furnace than is possible by withdrawing the ingot and cooling by air. This invention thus enables the cooling of materials at an accurate and predetermined rate to provide metallurgical characteristics not obtainable by air cooled or other ordinary furnace cooled practices. By the practice of this invention different metallurgical characteristics are obtainable in cooling either more quickly or more gradually than either of the two processes of air and furnace cooling or intermediate of the two. As an example chilled air may be employed for quickly and accurately reducing the temperature at a predetermined rate, thereby approximating the metallurgical characteristics of an oil or water cooled or quenched ingot. To obtain these results the artificially loaded fluid is thermally conditioned by the control apparatus and the method of applying the heat and the fluid. Thus the flexibility of a furnace operated with this method is materially increased.

Accurate control is obtainable in a furnace by the use of this invention when heat treating partial loads. In actual practice a furnace is ordinarily designed to produce a predetermined output under a fixed set of conditions. If these furnaces are underloaded or overloaded material losses result. Such losses may be due to the resultant metallurgical characteristics of the steel, the lack of proper heat, or the overheating of the material. It is easily seen that by controlling the furnace load artificially in the manner presented by this invention these problems are eliminated and the flexibility and dependability of the furnace increased many fold.

The graph shown in Fig. 10 illustrates curves representing the flow of fluid through the furnace. The curve 80 represents the total flow of fluid through the furnace. If the pressure within the furnace is maintained at a constant predetermined value 80 becomes a straight line and the area under the curve represents the total volume of fluid passing through the furnace chamber. In a gas fired furnace the total volume of fluid is made up of fuel, primary air and the artificial loading.

Assuming that the furnace is operated at full load under ideal conditions wherein the fuel and primary air required during the firing period is such that no artificial loading is necessary to maintain the predetermined pressure, then flow of fuel is represented by the curve 81. It will be noted that curve 81 represents the flow of the gaseous fuel for the thermal cycle illustrated in Fig. 9 and the peak furnace temperatures during the stabilization periods $a$ and $b$ are the same. These temperatures are maintained by reducing the flow of fuel and primary air to the furnace and starting the flow of artificial loading with a cooling fluid at a corresponding rate, thus always maintaining a constant fluid flow resulting in a constant fluid pressure within the furnace. These stabilization periods are sufficiently long to allow for the temperature lag of the material as stated above. The automatic program timer completes the transition from the heating phase to the cooling phase of the thermal cycle when the temperature of the steel reaches the ultimate or peak as represented by the dotted line in Fig. 9.

Curve 82 in Fig. 10 represents the flow of primary air to the furnace which follows the shape of the fuel curve 81, as the volume of primary air must be proportional to the volume of fuel supplied.

The double line curve 83 represents the flow of artificial loading to the furnace. This curve is obviously equal to the inverse summation of the curves 81 and 82 as represented by the curve 84, since the total volume of fluid entering the furnace chamber for any increment of time is the same.

The fuel flow required to supply the furnace losses for this heating program is represented by the curve 85. Thus the difference between the areas under curves 81 and 85 represents the fuel consumed to heat the furnace load which is the steel and the artificial load.

Since the steel reaches the predetermined ultimate temperature during the stabilization periods when transition of fuel and artificial loading is taking place, the absorption of heat by the steel falls off and is taken up by the artificial loading. This transference of heat absorption from the steel load to the artificial load is represented by the dotted line 86. Thus the fuel employed to heat the steel is represented by the area bounded by the curves 81, 85 and 86 during the firing and transition periods.

It will be noted that the curve 86 drops below the furnace loss fuel flow curve 85 during the reduced firing period. Thus the area bounded by the curves 81, 85 and 86 during the reduced firing periods represents the fuel consumed to heat the artificial air and the area between curves 85 and 86 during the same period represents the heat absorbed by the artificial loading from the steel. The total heat absorbed by the artificial loading during the time it is applied is thus proportional to the area between curves 81 and 86.

If the furnace is not loaded with steel to its full capacity and the same firing conditions as described above are to be duplicated, it may be necessary to supply artificial loading during the firing periods. However this should be avoided if possible because the heat absorbed by artificial loading during the firing period is not useful heat. It would be more economical to vary the rate of heating the steel and thereby supply sufficient fuel and primary air to provide the proper furnace pressure.

Artificial loading is necessary when the desired rate of thermal loss of the steel in the furnace is greater than the combined thermal losses of the furnace. If the rate of cooling of the steel is less than the combined furnace losses then the steel could be cooled within the furnace but there would be no definite control of the rate of cooling which is paramount to the production of the proper metallurgical characteristics.

When the hydrostatic force of rising convection currents in the furnace, resulting from the burning fuel, is greater than the draft force required to move the gases downwardly through the furnace to exhaust, local excessive temperatures are created at the top of the furnace. The rate of artificial loading may be increased to overcome the effect of these convection currents and eliminates these disadvantages. Only the addition of a cooling medium in the top of the furnace will lower the local temperature at the top, and an increase of the total flow beyond the line of stabilization, may be effected by opening the dampers to thereby effect a transfer of heat from top to bottom where the waste gas outlets are located. The convection current is a natural heat carrier medium moving heat upward. The artificial fluid load is the means for compensating this tendency by carrying the heat downward.

Again the artificial loading provides an adequate carrier medium for uniformly conveying the burning gases over extensive surfaces of the materials being heated such as armor plate.

Fig. 10 shows that, in order to elevate the work to its ultimate temperature with economy, the furnace must have a degree of thermal stability, brought about by insulated walls, etc. that would not permit a sufficient rate of heat dissipation to cool the work at its prescribed rate. When the predetermined maximum temperature is reached the fuel flow is automatically reduced to the rate at which the then desired temperature within the furnace is maintained. If the next step in the cycle is cooling, at a rate which is faster than all the normal heat losses from the furnace, there will be introduced a volume of low temperature fluid into the furnace, through the medium of the automatic cycle control, to accelerate the movement of cooling fluid through the furnace to sustain the pressure as the fuel supply is turned off due to no demand for heat. Then the heat absorbed by the fluid from the work and the furnace walls tends to reduce the temperature along the prescribed cycle of control.

This graph further shows that in order to reduce the temperature of the furnace and the work along the prescribed cycle the fuel must under ordinary conditions be reduced far below the holding rate. Inasmuch as this reduction is automatic it can obviously reach the point where burner operation becomes unsatisfactory and hazardous. Therefore the artificially loaded furnace may also have an initial fluid load to anticipate such conditions.

The quantity of cold fluid introduced into the furnace would be adjusted to the point where the rate of temperature reduction will be greater than that dictated by the cycle control, when cooling is a part of the cycle.

The nature of many steels is such that they must be heated in atmospheres below certain critical ranges, say at 1650° F., which is about 1200° F. below the normal flame temperature of industrial fuels, but the temperature of the gases heating the product should not exceed 1800° F. Therefore the forms of the furnace having combustion chambers outside the furnace heating chambers, also thermally condition the gases by the admission of cold air or waste gases, so that the gases enter the furnace and can be spread over the steel at once without local overheating.

In order positively to accomplish this objective in furnaces where the combustible mixture is introduced at remote elevation above the outlet ports such as deep pit furnaces a thermocouple is interposed in the path of the furnace gases between their origin and the steel to be heated and determines the rate of thermal input to the furnace. A second thermocouple is placed in the path of the furnace gases between the work and the outlet ports and through a temperature differential controller admits loading fluid to the furnace at a predetermined rate when the temperature differential between the two thermocouples exceeds its permissible value. The resultant acceleration of fluid motion toward the bottom of the furnace combined with the increased fuel input will restore the parity of temperature between top and bottom of work.

This device for artificially loading a furnace would normally be used as a safety provision to supersede the device described in the following paragraph when the temperature differential between top and bottom of furnace became excessive. In shallow furnaces where there is relatively small difference in elevation between the source of heat input and the waste gas exit ports the temperature differential between top and bottom of furnace would be negligible and the temperature differential controller could be omitted.

Normally the furnace pressure regulator on an industrial furnace operates a damper in the exit flue or chimney to maintain a constant furnace pressure. In batch type operation this results in the damper being in closed position when the work has been elevated to its maximum temperature and the fuel flow reaches a minimum. Consequently the fluid within the furnace tends to become static and excessive temperatures develop in spots when the work temperature is at its most critical point. It is preferred to set the chimney damper at a fixed position and in furnace operations where the pressure is of paramount importance control the quantity of loading fluid to maintain that pressure at a constant value by means of the furnace pressure regulator. Then as the normal flow of combustibles is reduced to maintain the furnace temperature at its maximum value a sufficient quantity of loading fluid will be admitted to the furnace to maintain the original rate and pattern of total fluid circulation.

In the conventional batch type heating operation the flow of fluid through the furnace must decrease in order to prevent the mass from exceeding its ultimate temperature. Consequently the velocity and pattern of fluid motion change to the extent that inequalities of temperature develop which prevent the completion of the temperature cycle in keeping with the precision standards of modern industrial practice. It is proposed to apply an artificial load to the furnace of such flexibility that its magnitude can be controlled positively according to the demands of the furnace for velocity of fluid movement. This demand can be measured by temperature differences or by simply measuring the rate of total fluid flow and hold the temperature difference within defined limits by controlling the velocity of fluid movement between the points of temperature measurement or hold the total fluid movement to a constant value by maintaining a constant pressure within the furnace.

In the final analysis, the materials are heated by convection in low temperature furnaces. It is therefore important to maintain a fluid flow through the furnace. This is accomplished by artificially loading the furnace to create and maintain a constant flow therethrough. The artificial loading compensates for the usual decrease in fluid flow when the material is thermally saturated and it insures uniform heat distribution irrespective of the thermal input. By initially mixing the artificial loading fluid with the burning fuel in a precombustion chamber a rich fuel may be diluted or conditioned to the desired temperature. Thus a high temperature fuel that burns at approximately 2800° F. may be introduced with the loading fluid into the furnace at a temperature above the range of heat treatment without injury to the material.

Through automatic control the preloading of the furnace artificially permits accurate control of the rate of heating and cooling of the material. A cam driven by a clock can thus be made to direct the time rate cycle of heat treatment. This regulation as previously described may be obtained by furnace pressure control without changing the discharge damper settings or the dampers may be regulated by the temperature of the furnace to reduce the pressure, causing the fluid flow to increase to overcome the natural convection and uniformly distribute the heat throughout the furnace.

We claim:

1. In a commercial heating furnace of the character described, the combination of means for introducing heat to the furnace chamber for heat treating the material therein, exhaust ports adjacent one end of the furnace chamber, artificial load ports adjacent the other end of the furnace chamber, means for supplying a non-combustible fluid to the artificial load ports, and means responsive to the temperature and pressure of the furnace chamber for controlling the supply of the non-combustible fluid independently of the supply of heat.

2. In a commercial heating furnace of the character described, the combination of means for introducing heat to the furnace chamber for heat treating the material therein, exhaust ports adjacent one end of the furnace chamber, artificial load ports adjacent the other end of the furnace chamber, means for supplying a non-combustible fluid to the artificial load ports, means responsive to the temperature and pressure of the furnace chamber for controlling the supply of the non-combustible fluid, and independent means responsive to the temperature of the furnace chamber for controlling the supply of heat thereto.

3. In a commercial heating furnace of the character described, the combination of means for introducing fuel to the furnace chamber, exhaust ports adjacent one end of the furnace chamber, artificial load ports adjacent the other end of the furnace chamber, means for supplying an artificial loading fluid to the artificial load ports, thermal responsive means adjacent one end of the furnace chamber for regulating the supply of fuel, pressure responsive means adjacent the other end of the furnace chamber for regulating the supply of a portion of the artificial load, and pressure responsive means in the furnace chamber for regulating the supply of the balance of the artificial load.

4. In a commercial heating furnace of the character described, the combination of a furnace chamber, a pre-combustion chamber, ports for introducing a fuel and air mixture into the pre-combustion chamber, ports for introducing a non-combustible fluid into the pre-combustion chamber, ports connecting the pre-combustion chamber with the furnace chamber, and ports for conducting the products from the furnace chamber.

5. The method of operating a heating furnace which comprises the steps of loading the furnace with the material to be heat treated, supplying heat to the furnace to thermally treat the material, and supplying artificial loading to the furnace to absorb a portion of the heat supplied, and varying the supply of heat and artificial loading, independently of each other to obtain a positive control of the heating cycle of the material.

6. The method of claim 5 characterized in that the artificial loading is atmospheric air.

7. The method of claim 5 characterized in that the artificial loading is independent of heat generation and products of combustion.

8. The method of claim 5, which also includes the step of regulating the supply of artificial loading to compensate for variations of fluid flowing through the furnace as the heat treatment progresses to maintain a constant furnace pressure.

9. The method of claim 5, which also includes the steps of regulating the supply of heat in accordance with a predetermined heating cycle, and regulating the supply of artificial loading to maintain a constant volume flow of fluid through the furnace as the heat treatment progresses.

10. The method of claim 5, which also includes the step of proportioning the supplies of heat and artificial loading to provide an unvaried flow of fluid through the furnace and maintain a constant pressure.

11. The method of operating a heat treating furnace which comprises the steps of supplying heat to the furnace to heat treat the material during one period of a predetermined thermal cycle, diminishing the heat supplied to the furnace during another period of the thermal cycle, and supplying artificial loading to the furnace independently of the supply of heat to absorb a portion of the heat during both periods of the heat treating cycle.

12. The method of operating the heat treating furnace which comprises the steps of supplying heat to the furnace to heat treat the material during one period of a predetermined thermal cycle, diminishing the heat supplied to the furnace during another period of the thermal cycle, supplying artificial loading to the furnace to absorb a portion of the heat during both periods of the heat treating cycle, and proportioning the supplies of heat and artificial loading to provide an unvaried flow of fluid through the furnace and maintain a constant pressure throughout the period of the heating cycle.

13. The method of operating a heat treating furnace which comprises the steps of supplying heat to the furnace during spaced periods of time to heat treat the material, shutting off the supply of heat to the furnace between the firing periods, and continuously supplying artificial loading to the furnace to absorb a portion of the heat during the firing period and a portion of the heat from the furnace and the material between firing periods to control the heat treating cycle.

14. The method of claim 13, which also includes the step of regulating the supply of artificial loading to maintain a constant fluid flow through the furnace during the heat treating cycle.

15. The method of heating a charge of substantial length to a uniform temperature in a gaseous heated batch type furnace which comprises locating the charge between heat measuring elements spaced on either side thereof with one of the elements in the normal path of the burned gases flowing to the waste gas exit, regulating temperature adjacent the heat measuring element remote from the waste gas exit by controlling the quantity of gaseous heat admitted to the furnace in response to the predetermined temperature setting of the heat measuring element, and regulating the desired temperature adjacent the waste gas exit by increasing or decreasing the flow of heated gases toward the exhaust in response to a predetermined temperature setting of the heat measuring element adjacent the said waste gas exit.

16. The method of operating a batch type heating furnace which comprises heating a charge in the furnace to a predetermined temperature with a combustible mixture, regulating the selected temperature in the furnace by varying the quantity of combustible admitted to the furnace progressively during the heating of the charge, adjusting the combustible exit resistance to establish a fixed desired atmospheric pressure in the furnace at the beginning of the heating operation, and producing a constant pressure in the furnace by admitting a variable quantity of a secondary gaseous fluid to the furnace progressively in response to pressure variations occurring in the furnace resulting from the variations in the quantity of combustibles admitted.

17. The method of operating a batch type furnace to alternately heat and cool a charge placed within the furnace through a predetermined timed temperature cycle which comprises, regulating the heating of the charge at the selected rates to the desired temperature by controlling the admission of heating gases in response to the timed movement of a heat measuring regulator, reducing the flow of heating gases to the furnace during a cooling cycle established by a further movement of the heat measuring regulator, and accelerating the cooling beyond the normal radiation and exhaust losses from the furnace by the controlled admission of a cooling fluid independently of the heating to maintain a predetermined atmospheric pressure in the furnace.

18. A batch type heating furnace comprising a charge receiving chamber, gaseous means for heating the charge and chamber to a predetermined temperature, means for regulating the selected temperature within the furnace by controlling the volume of the gaseous heating medium admitted to the chamber, means for measuring the pressure of the gases within the chamber which includes means to regulate the flow of a secondary gaseous medium into the furnace to compensate for variations in the volume of the gaseous heating medium admitted to the furnace and to maintain a constant uniform pressure therein during the saturation of the charge in the chamber whereby the flow of gases from the furnace is substantially uniform in volume, and damper means for adjusting the flow of the waste gases independent of the temperature or pressure control means.

19. The method of heat treating a charge of substantial length in a fuel heated furnace chamber which comprises, supplying a heating medium to thermally treat the charge through a controlled predetermined thermal cycle, introducing the heating medium at one end and discharging it at the other end of the chamber, measuring the temperature of the heating medium adjacent its introduction and discharge, admitting an artificial loading fluid to the chamber, and regulating the rate of flow of the loading fluid in accordance with the differential between the measured temperatures to maintain a uniform temperature throughout the chamber.

WILLIAM A. MORTON.
EDWIN G. SMITH.

REFERENCES CITED

The following references are of record in the file of this patent:

UNITED STATES PATENTS

| Number | Name | Date |
| --- | --- | --- |
| 1,555,549 | Brown | Sept. 29, 1925 |
| 1,664,318 | Peebles | Mar. 27, 1928 |
| 1,704,280 | Burton | Mar. 5, 1929 |
| 1,819,772 | Darrah | Aug. 18, 1931 |
| 1,895,701 | Brown | Jan. 31, 1933 |
| 1,896,910 | Merkt | Feb. 7, 1933 |
| 1,926,714 | Culbertson | Sept. 12, 1933 |
| 1,940,355 | Knapp | Dec. 19, 1933 |
| 1,979,639 | Rebber | Nov. 6, 1934 |
| 2,029,580 | Merkt | Feb. 4, 1936 |
| 2,040,328 | Olson | May 12, 1936 |
| 2,085,811 | Loftus | July 6, 1937 |
| 2,137,868 | Wilson | Nov. 22, 1938 |
| 2,228,088 | Roth | Jan. 7, 1941 |
| 2,233,629 | Merrill | Mar. 4, 1941 |
| 2,252,323 | Krogh | Aug. 12, 1941 |
| 2,282,226 | Hoop | May 5, 1942 |
| 2,283,745 | Lines | May 19, 1942 |
| 2,285,036 | Kneass | June 2, 1942 |
| 2,293,550 | Kells | Aug. 18, 1942 |
| Re. 22,188 | Minor | Sept. 29, 1942 |
| 2,370,897 | Whitcomb | Mar. 6, 1945 |